United States Patent
Christensen et al.

(10) Patent No.: US 7,035,249 B2
(45) Date of Patent: Apr. 25, 2006

(54) OPTIMIZING BANDWIDTH OF DSL CONNECTIONS

(75) Inventors: Jacob M. Christensen, Virum (DK); Bent S. Jensen, Frederiksberg C. (DK)

(73) Assignee: Intel Corporation, Santa Clara, CA (US)

( * ) Notice: Subject to any disclaimer, the term of this patent is extended or adjusted under 35 U.S.C. 154(b) by 964 days.

(21) Appl. No.: 09/818,786

(22) Filed: Mar. 28, 2001

(65) Prior Publication Data

US 2002/0141443 A1 Oct. 3, 2002

(51) Int. Cl.
*H04L 12/66* (2006.01)

(52) U.S. Cl. ........................ 370/352; 370/468
(58) Field of Classification Search ................ 370/468, 370/477, 488, 497, 230, 235, 352, 391, 422, 370/463, 210, 354, 395.1, 419, 437, 353, 370/356, 395.21, 395.41, 395.42, 465; 375/211, 375/222, 225; 709/216, 224, 227
See application file for complete search history.

(56) References Cited

U.S. PATENT DOCUMENTS

| | | | |
|---|---|---|---|
| 5,987,061 A * | 11/1999 | Chen | 375/222 |
| 6,181,711 B1 * | 1/2001 | Zhang et al. | 370/468 |
| 6,351,487 B1 * | 2/2002 | Lu et al. | 375/225 |
| 6,388,990 B1 * | 5/2002 | Wetzel | 370/230 |
| 6,452,923 B1 * | 9/2002 | Gerszberg et al. | 370/352 |
| 6,512,739 B1 * | 1/2003 | Heidari et al. | 370/210 |
| 6,580,727 B1 * | 6/2003 | Yim et al. | 370/463 |
| 6,636,505 B1 * | 10/2003 | Wang et al. | 370/352 |
| 6,658,499 B1 * | 12/2003 | Day et al. | 710/8 |
| 6,667,991 B1 * | 12/2003 | Tzannes | 370/465 |
| 6,704,351 B1 * | 3/2004 | Ott et al. | 375/222 |
| 6,760,333 B1 * | 7/2004 | Moody et al. | 370/395.1 |
| 2002/0012353 A1 * | 1/2002 | Gerszberg et al. | 370/419 |
| 2002/0107935 A1 * | 8/2002 | Lowery et al. | 709/216 |
| 2002/0131436 A1 * | 9/2002 | Suri | 370/419 |

* cited by examiner

*Primary Examiner*—Phirin Sam
(74) *Attorney, Agent, or Firm*—Kacvinsky LLC

(57) ABSTRACT

An arrangement is provided for optimizing the bandwidth of DSL connections. A DSL connection is established via a customer premise equipment, a copper line connecting to the customer premise equipment, and a DSL access multiplexer connecting to the copper line. The DSL connection is operated at a transmission rate that is adaptively optimized through a DSL connection optimizer based on dynamic transmission environment.

21 Claims, 10 Drawing Sheets

OPTIMIZING BANDWIDTH OF DSL CONNECTIONS

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to Digital Subscriber Line (DSL) transmission. Other aspects of the present invention relate to multi-rate Symmetric DSL transmission.

Multi-rate symmetric DSL technologies usually use line probing at initialization time when a DSL connection is established. This implies that the negotiation and the selection of the transmission rate are based on the characteristics of the transmission environment detected during a relatively short period at the line probing during the initialization time.

The characteristics of a copper based transition system change dynamically over time and the changed characteristics affect the transmission environment. Examples of such characteristics include signal noise and cross talk. Some changes may lead to a worse transmission environment and some changes may lead to an improved transmission environment. For example, improved signal noise and/or reduced cross talk may improve the transmission environment. An improved transmission environment may represent an opportunity to upgrade a DSL connection to a higher transmission rate.

In current systems, symmetric DSL connections are not adaptive to the transmission environment. That is, the transmission rate after the line probing is fixed in a symmetric DSL connection. In asymmetric DSL connections, there are solutions that automatically adapt transmission rate according to the change in transmission environment. For example, signal to noise ratio is monitored after an asymmetric DSL connection is set up and running. Whenever the signal to noise ratio improves, the number of bits transmitted per symbol is automatically increased. Whenever signal to noise ratio degrades, the number of bits transmitted per symbol is automatically decreased.

Such adaptation in asymmetric DSL connections is usually performed without disrupting the connection when the transmission rate is being adapted. That is, the transmission rate is adjusted on the run without re-initializing the connection. One problem associated with this solution is that various parameters used in filters in both Customer Premise Equipment (CPE) and DSL Access Multiplexer (DSLAM) remain un-adjusted. This is due to the fact that no line probing or initialization is performed during the adaptation. This means that the automatic adaptation in current asymmetric DSL connections makes use of a gain obtainable in a filter setup that is adjusted according to the environment as it was by the time of the initial line probe. In this case, even though the transmission rate is adjusted to operate at an optimal speed, the transmission itself may not be operated with an optimal quality due to un-adjusted filter parameters.

Some other DSL arrangements allow a user to re-start the line probing process. With such a human-controlled re-start, operation of the connection is usually not based on the dynamic information about the current transmission environment.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

Figure 1:
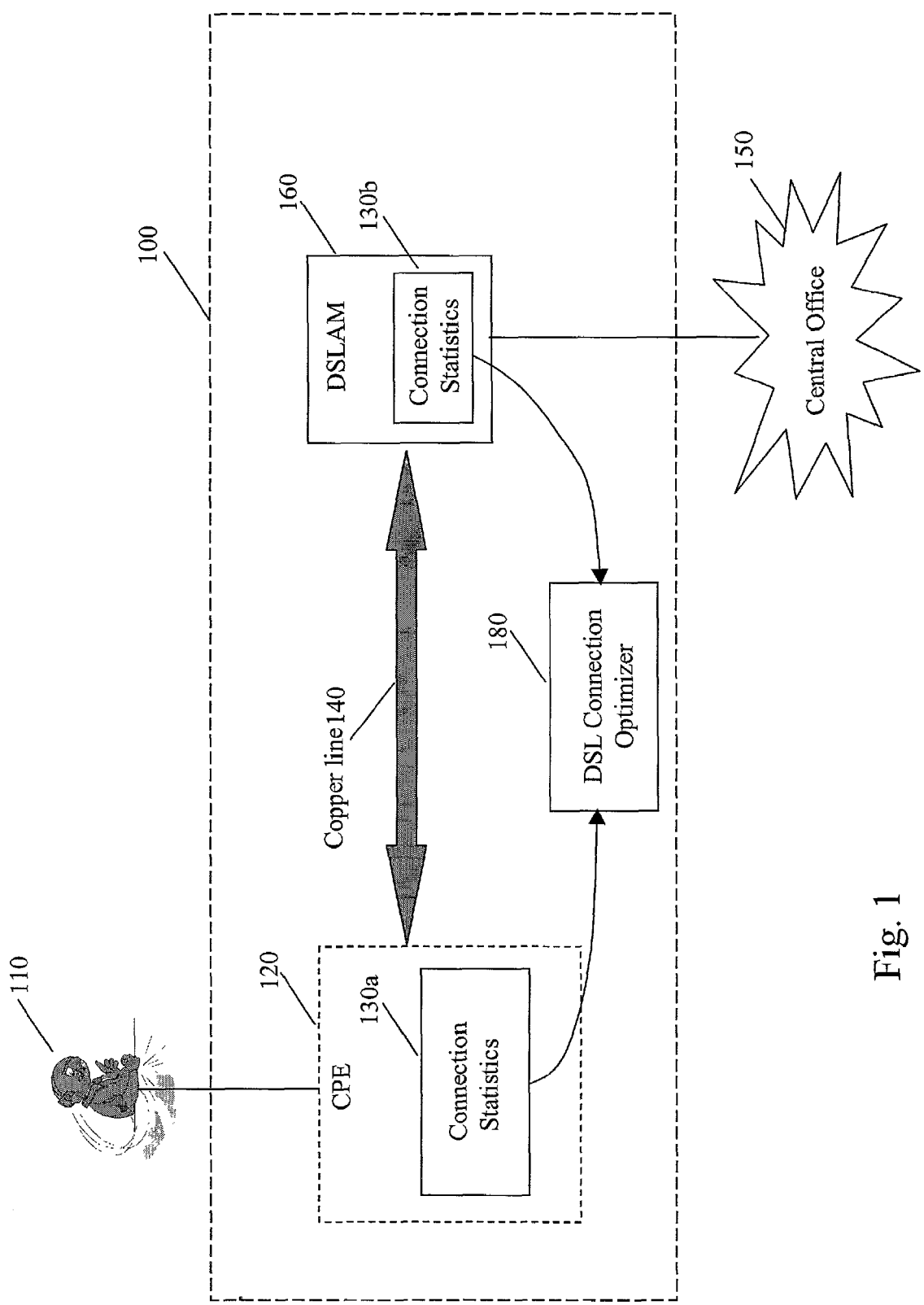
FIG. 1 is a high level system architecture of one embodiment of the present invention, in which the transmission rate over a DSL connection is optimized by a stand-alone DSL connection optimizer.

The present invention addresses adaptively establishing a DSL connection with an optimized transmission rate by re-initializing the DSL connection at an appropriate time. FIGS. 1 to 4 show the high level system architectures of various embodiments of the present invention, in which the transmission rate over a DSL connection is optimized through one or more DSL connection optimizers. FIG. 1 is the high level architecture of one embodiment of the present invention, in which the transmission rate over a DSL connection between a user 110 and a central office 150 is established and optimized by a system 100.

System 100 shown in FIG. 1 comprises a Customer Premise Equipment (CPE) 120 containing a set of connection statistics 130a which may be stored in the chipset of the CPE 120, a copper line 140, a Digital Subscriber Line Access Multiplexer (DSLAM) 160 containing a set of connection statistics 130b which may be stored in the chipset of the DSLAM 160, and a Digital Subscriber Line (DSL) connection optimizer 180. In FIG. 1, the DSL connection between the user 110 and the central office 150 is established via the CPE 120, the copper line 140, and the DSLAM 160. The DSLAM 160 may be physically located in the central office 150.

The DSL connection between the user 110 and the central office 150 may be established by system 100 with a transmission rate that is negotiated using line probing at initialization time when the connection is set up. The negotiation of the transmission rate is based on the characteristics of the transmission environment detected during a relatively short period of line probing. Such characteristics may include noise, which may be generated from the adjacent wire pairs in the telephone cable in which the DSL signal is routed. The variations in the connecting speed (or transmission rate) between two devices (e.g., CPE 120 and DSLAM 160) may primarily depend on the noise conditions present on the DSL connection line when the two devices connect.

Once the DSL connection is established, both the CPE 120 and the DSLAM 160 gather and record connection statistics 130*a* and 130*b*, respectively. Such connection statistics reflect the varying characteristics of the transmission environment. Examples of such connection statistics include Signal to Noise Ratio (SNR), Cyclin Redundancy Check (CRC) count, and Loop Attenuation (LA). When the noise or cross talk from the equipment running on the adjacent wires changes, less noise may be generated which may lead to an increase in SNR. Such change can be captured in the reported SNR and CRC values.

A change in transmission environment, particularly in noise level and cross talk, may be caused by different reasons. For example, noise in cable tandem sections may be reduced because of temperature change or physical vibrations; non-compliant equipment may be taken out of service; faulty equipment may be repaired; equipment may be recently adjusted properly; line test equipment may be removed; noise filters may be applied to the line; or water may have been pumped out of the cable.

The changing transmission environment may provide an opportunity to improve the transmission rate. Particularly, when, for example, a significant improvement (e.g., 10–20%) in CRC or SNR is reported, it is possible that the equipment will attain a higher rate if the DSL connection is re-initialized. Through the re-initialization, the current less than optimal transmission rate may be stepped up. In the FIG. 1 arrangement this is achieved through the DSL connection optimizer 180.

The DSL connection optimizer 180 monitors the transmission environment through the connection statistics. The connection statistics used by the DSL connection optimizer 180 may be from the CPE 120 alone (130*a*), from the DSLAM 160 alone (130*b*), or from both (130*a* and 130*b*). Based on the connection statistics, the DSL connection optimizer 180 may detect a change in transmission environment and determine a potential performance gain associate with the changed transmission environment.

A detected potential performance gain may be achieved by re-initializing the underlying DSL connection. The re-initialization may be performed automatically or manually. For the former case, the DSL connection optimizer 180 may determine an appropriate time, according to certain criteria, to conduct the re-initialization. For example, such criteria may be designed so that the disruption caused by the re-initialization to the transmission over the DSL connection is minimized. If the re-initialization is to be performed manually, the DSL connection optimizer 180 notifies the user 110 about the potential performance gain.

In system 100, the DSL connection optimizer 180 adaptively optimizes the transmission rate along the DSL connection between the user 110 and the central office 150. The optimization is performed based on the dynamic transmission environment. Details of the DSL connection optimizer 180 are described with reference to FIGS. 6 to 10. In FIG. 1, the DSL connection optimizer 180 is illustrated as a stand-alone device. This is not necessarily the case. Different system configurations of the DSL connection optimizer 180 are shown in FIG. 2 to FIG. 4, all consistent with different embodiments of the present invention.

Figure 2:
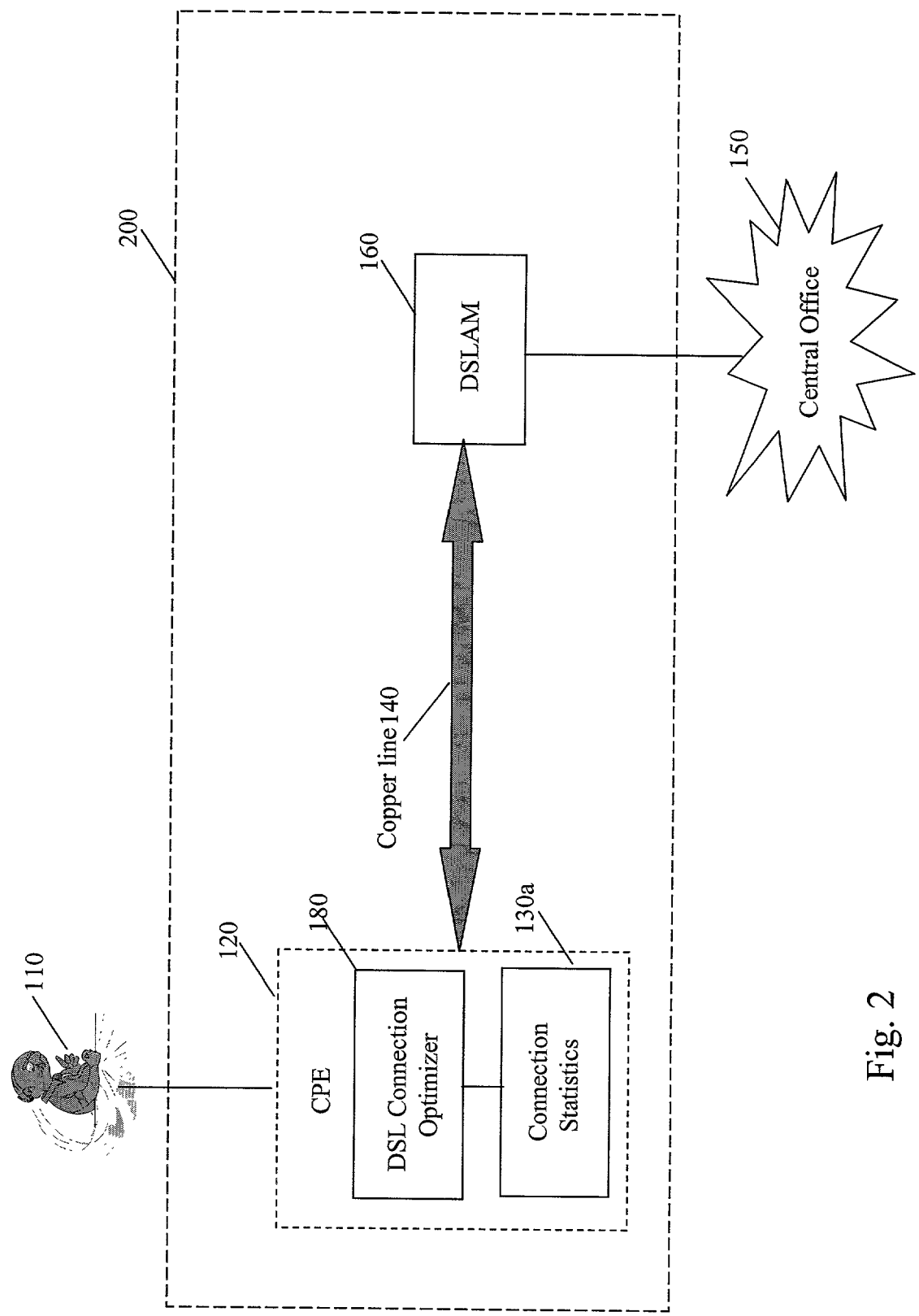
FIG. 2 is a high level system architecture of another embodiment of the present invention, in which the transmission rate over a DSL connection is optimized by a DSL connection optimizer in a customer premise equipment.

FIG. 2 shows a high level system architecture of a different embodiment of the present invention, in which the transmission rate over a DSL connection between the user 110 and the central office 150 is optimized by a DSL connection optimizer 180*a* located within the CPE 120. With this configuration, the DSL connection optimizer 180*a* may perform the DSL connection optimization based on the connection statistics 130*a* recorded in the CPE 120.

Figure 3:
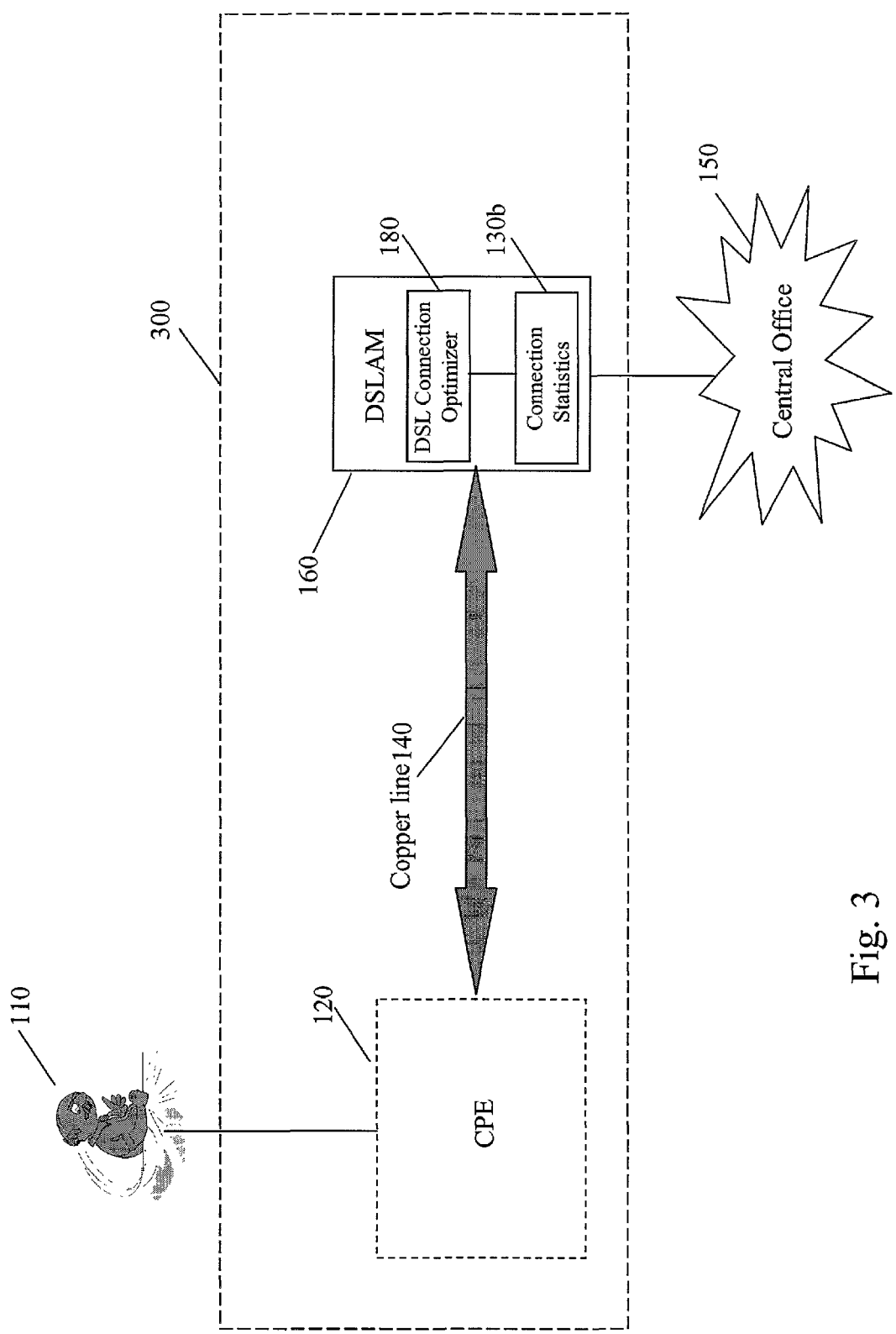
FIG. 3 is a high level system architecture of another embodiment of the present invention, in which the transmission rate over a DSL connection is optimized by a DSL connection optimizer in a DSL access multiplexer.

FIG. 3 shows a high level system architecture of another embodiment of the invention, in which the transmission rate over a DSL connection between the user 110 and the central office 150 is optimized by a DSL connection optimizer 180*b* located within the DSLAM 160. With this configuration, the DSL connection optimizer 180*b* may perform the DSL connection optimization based on the connection statistics 130*b* recorded in the DSLAM 160.

Figure 4:
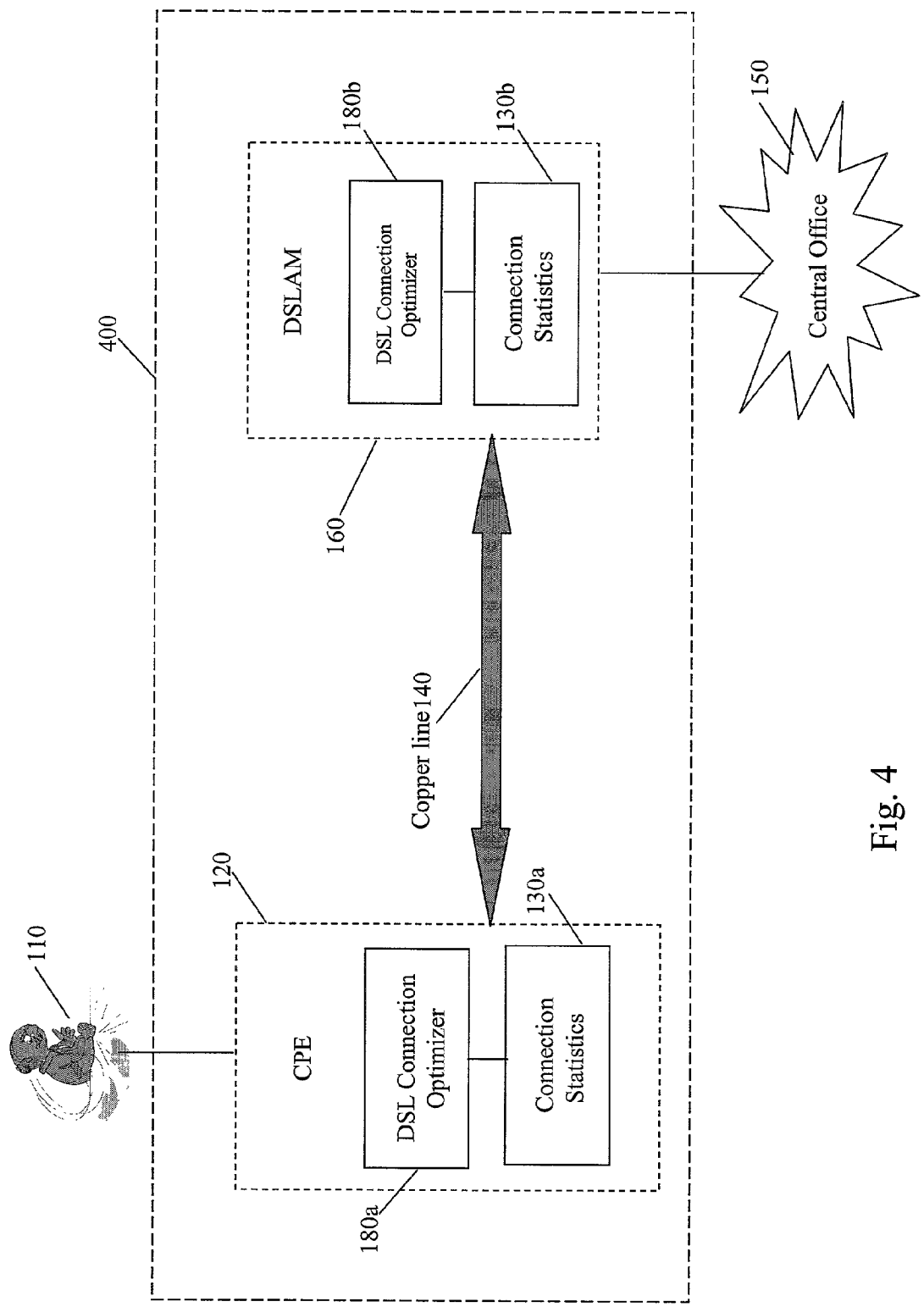
FIG. 4 is a high level system architecture of yet another embodiment of the present invention, in which the transmission rate over a DSL connection is optimized by two collaborating DSL connection optimizers.

FIG. 4 shows a high level system architecture of yet another embodiment of the present invention, in which the transmission rate over a DSL connection between the user 110 and the central office 150 is optimized by two DSL connection optimizers (180*a* and 180*b*), with one located within the CPE 120 and the other located within the DSLAM 160. With the configuration shown in FIG. 4, the DSL connection optimizers 180*a* and 180*b* may perform the DSL connection optimization based on either the connection statistics recorded in the device where the optimizer resides (e.g., 180*a* resides in CPE 120 and 180*b* resides in DSLAM 160) or the connection statistics recorded in both devices. The two DSL connection optimizers 180*a* and 180*b* may perform the optimization independently or jointly.

When the two DSL connection optimizers 180*a* and 180*b* work independently, they may access certain connection statistics and make optimization decisions separately. Since the CPE 120 and the DSLAM 160 may exchange information (statistics) on a continuous basis so that the connection statistics 130*a* and the connection statistics 130*b* represent the identical content, the two optimizers may act coherently if they access similar types of connection statistics.

It is also possible that the two DSL connection optimizers 180*a* and 180*b* are implemented differently. For example, if the two optimizers access different types of connection statistics, they may react differently within a same transmission environment. For instance, the DSL connection optimizer 180*a* may decide at a particular time that a re-initialization may bring a significant performance gain while the DSL connection optimizer 180*b* may simultaneously decide that the potential performance gain due to the same changing transmission environment is not significant enough to re-initialize the connection.

It is also possible to realize the two DSL connection optimizers 180*a* and 180*b* so that they perform the optimization through collaboration. The two optimizers may access different statistics to monitor different aspects of the transmission environment and then decide the optimization strategy through communication and negotiation. Whenever one optimizer identifies a potential performance gain based on certain aspects of the transmission environment, it may inform the other which may verify the potential gain by examining other aspects of the transmission environment. When both optimizers agree on a potential performance gain, a re-initialization may be activated.

Figure 5:
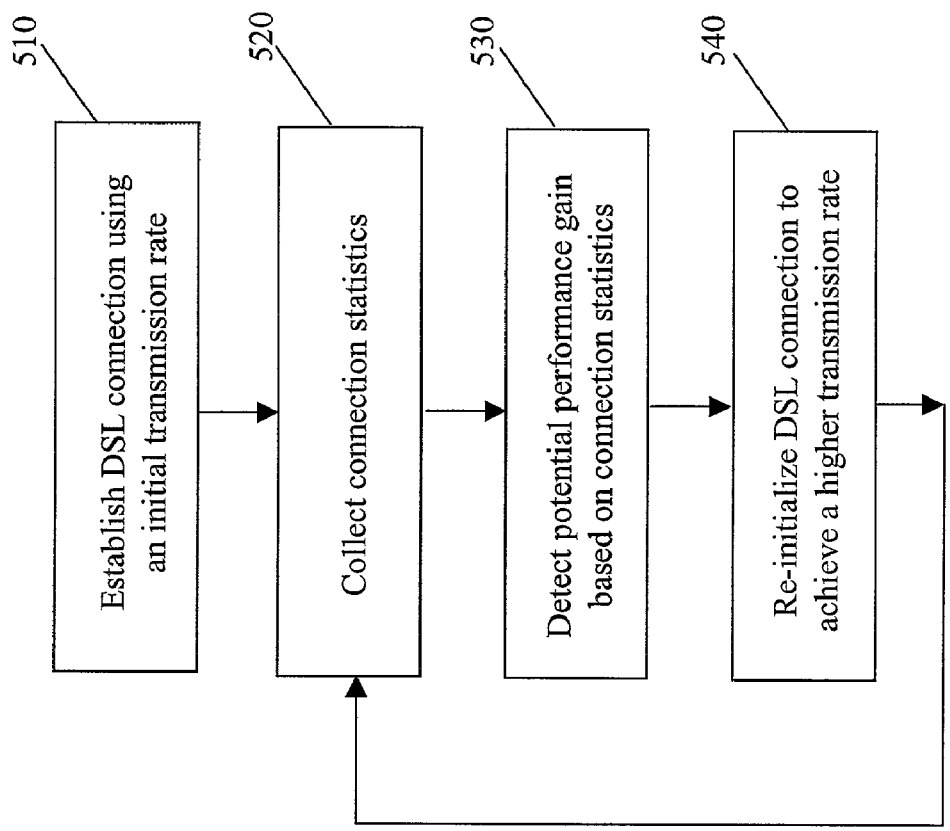
FIG. 5 is an exemplary flowchart of a process, in which the transmission rate over a DSL connection is adaptively optimized based on transmission environment.

FIG. 5 is an exemplary flowchart of a process, in which a DSL connection is established with a transmission rate that is adaptively optimized. In FIG. 5, a DSL connection is initially established, at 510, using an initial transmission rate negotiated during the line probing. Various connection statistics are collected, at 520, after the DSL connection is established. A potential performance gain is estimated, at 530, based on an detected change in the transmission environment. A varying transmission rate may be achieved by re-initializing, at 540, the DSL connection. Once the DSL connection is re-established with a changed transmission rate, the process repeats by starts again to collect, back to 520, the connection statistics relevant to the transmission environment.

Figure 6:
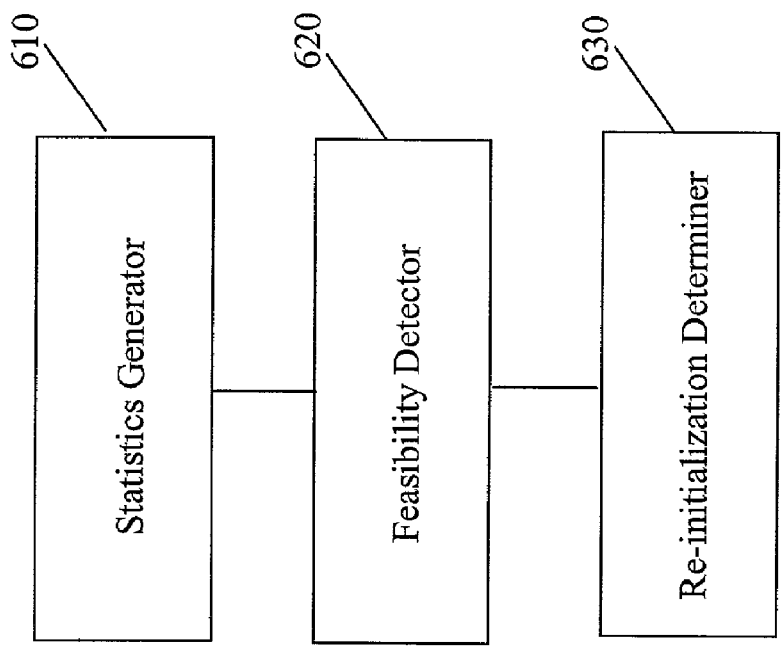
FIG. 6 is a high level block diagram of a DSL connection optimizer.

FIG. 6 shows the internal structure of the DSL connection optimizer 180. In FIG. 6, the DSL connection optimizer 180 comprises a statistics generator 610, a feasibility detector 620, and a re-initialization determiner 630. The statistics generator 610 gathers connection statistics from devices (CPE 120 or DSLAM 160 or both) and generates different measures that facilitate the detection of a potential performance gain. The feasibility detector 620 estimate, based on the measures generated by the statistics generator 610, how feasible to gain transmission performance through re-initialization. If a potential performance gain is feasible (determined by the feasibility detector 620), the re-initialization determiner 630 decides how and when to perform a re-initialization of the underlying DSL connection to achieve a higher transmission rate.

Figure 7:
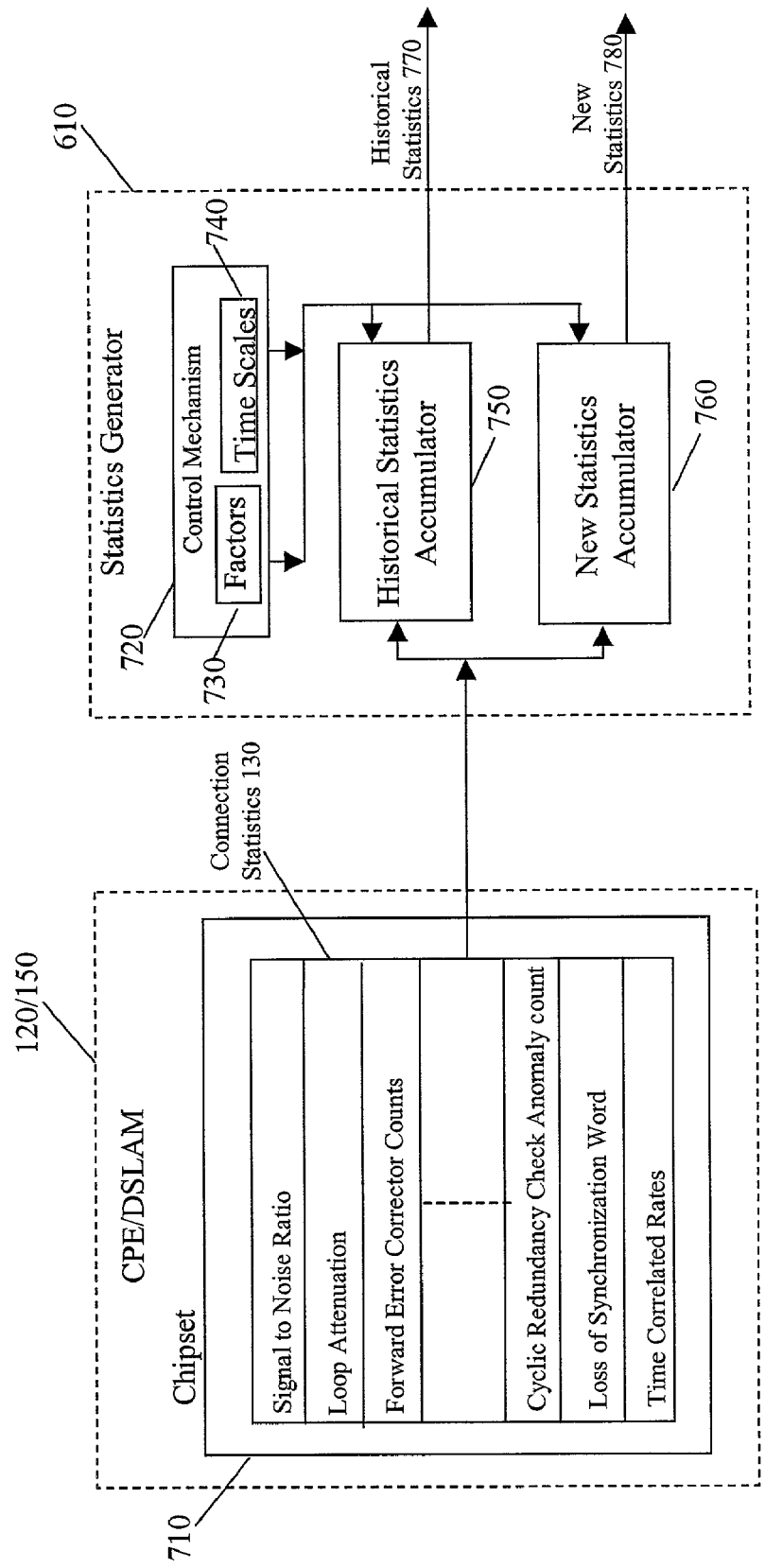
FIG. 7 shows the internal structure of a statistics collector and its relationship with the connection statistics recorded on a chipset in a customer premise equipment (or a DSL access multiplexer)

FIG. 7 depicts the internal structure of the statistics generator 610 and its relationship with a chipset in an access device (e.g., CPE 120 or DSLAM 160). In FIG. 7, the statistics generator 610 comprises a control mechanism 720, a historical statistics accumulator 750, and a new statistics accumulator 760. The historical statistics accumulator 750 generates historical statistics 770 that reflect the past transmission environment. The new statistical accumulator 760 generates new statistics 780 that reflect the current transmission environment. A potential performance gain may then later be estimated based on the difference between the current transmission environment and the past transmission environment.

FIG. 7 also shows that a DSL access device (CPE 120 or DSLAM 160) includes a chipset 710 which stores recorded connection statistics 130. Various connection statistics over a period of time may be recorded in the chipset 720. For example, the chipset 720 may record Signal to Noise Ratio, Loop Attenuation, Forward Error Corrector Counts, Cyclic Redundancy Check Anomaly Counts, Loss of Synchronization Word, and Time Correlated Rates. Each of the statistics may be recorded over a period of, for example, 24 hours.

The two accumulators (750 and 760) in the statistics generator 610 gather useful connection statistics stored in the chipset 710 according to a control mechanism 720, that may contain information about what connection statistics to be collected and in what fashion the statistics should be accumulated. In FIG. 7, the control mechanism 720 includes a list 730 of factors, which are considered relevant to the transmission environment, and a list 740 of time scales based on which the statistics on different factors are to be accumulated. For example, SNR may be listed in 730 as an important factor in determining a transmission environment and 15 minutes may be listed in 740 as the time scale to accumulate SNR statistics.

Based on the configuration illustrated in FIG. 7, the control mechanism 720 may instruct the historical statistics accumulator 750 to collect SNR statistics from 15 minutes ago (from the chipset 720) and to generate historical statistics 770 that describe the transmission environment timed at 15 minutes ago. Furthermore, the control mechanism 720 may instruct the new statistics accumulator 760 to collect the SNR statistics from the last 15 minutes and to generate new statistics 780 that describe the transmission environment in the last 15 minutes.

Figure 8:
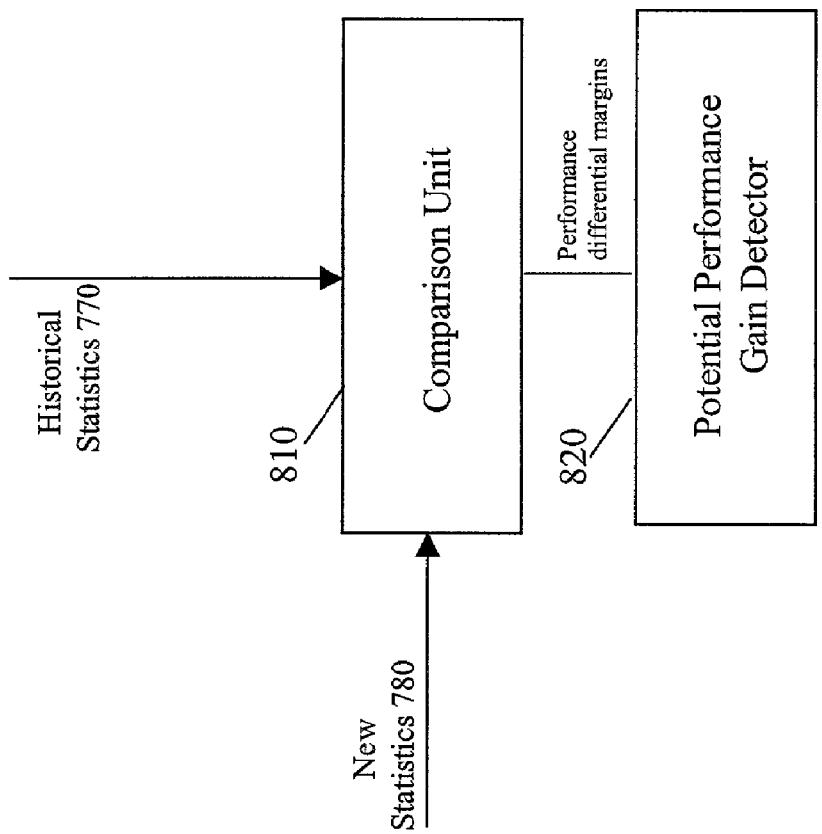
FIG. 8 shows the internal structure of a feasibility detector.

FIG. 8 depicts the internal structure of the feasibility detector 620, which comprises a comparison unit 810 and a potential performance gain detector 820. The comparison unit 810 compares the past transmission environment, represented by the historical statistics 770, with the current transmission environment, represented by the new statistics 780, to examine whether there is a change in the transmission environment. The detected environment change may indicate an improvement or a degradation of the transmission environment. Based on the transmission environment change, a potential performance gain is determined by the potential performance gain detector 820. Depending on whether the change represents an improvement or a degradation, the potential performance gain may be positive, implying that a higher transmission rate may be achieved, or negative, implying that a lower transmission rate may be expected.

The detection of a change in transmission environment may be implemented with respect to certain factors that are considered relevant to the transmission environment. The change in transmission environment may then be represented by the performance differential margins detected with respect to such factors. For example, the comparison unit 810 may compare historical SNR statistics with new SNR statistics (accumulated from different periods, one may correspond to the past and one corresponds to current). The comparison may generate a SNR performance differential margin, which may represent an improvement of the transmission environment (increase in SNR) or a degradation of the transmission environment (decrease in SNR).

The performance differential margins generated by the comparison unit 810 may then be used by the potential performance gain detector 820 to determine whether the detected change may lead to a performance gain (may be positive or negative). Specific conditions may be applied in determining a performance gain. For example, such conditions may include "if the SNR margin has increased by a factor of 1.5 in the last 15 minutes" or "if the CRC count has been decreased by a factor of 5 in the last 15 minutes". When a transmission environment change satisfies a specified condition, a potential performance gain is detected.

Figure 9:
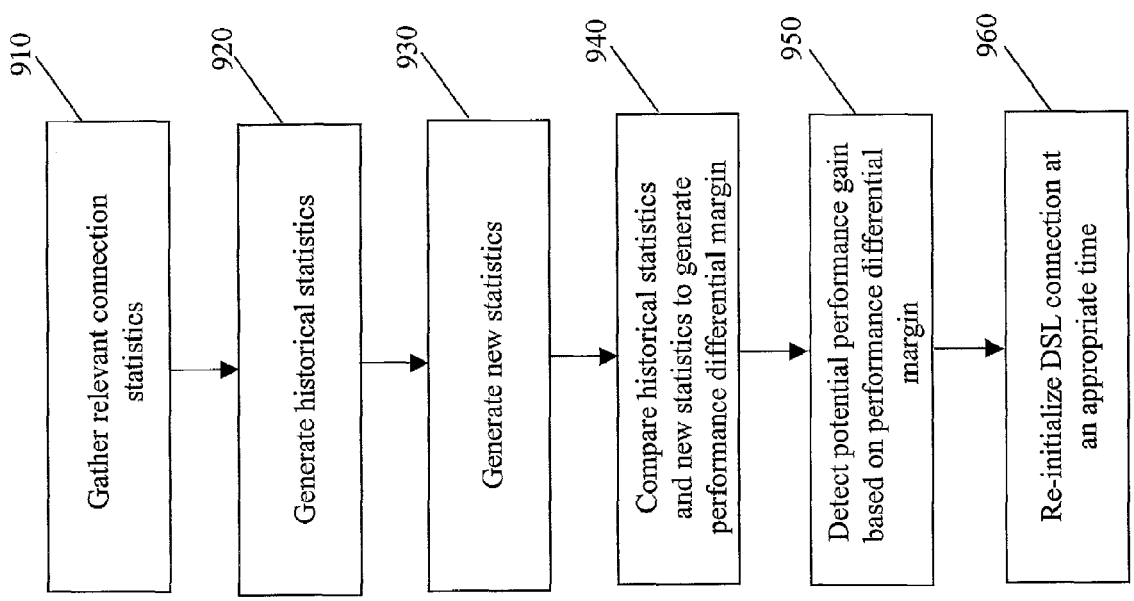
FIG. 9 is an exemplary flowchart for a DSL connection optimizer.

FIG. 9 shows an exemplary flowchart for the DSL connection optimizer 180. Relevant connection statistics (e.g., specified by the control mechanism 720) are first gathered at 910. Based on the collected connection statistics, historical statistics and new statistics are generated, at 920 and 930, to characterize the past transmission environment and the current transmission environment, respectively. The historical statistics are compared, at 940, with the new statistics to generate performance differential margins which is then used, at 950, to estimate a potential performance gain.

When a potential performance gain is detected, it may be realized by re-initializing the underlying DSL connection. Since the re-initialization may be performed while the DSL connection is still alive, choosing an appropriate time to re-initialize may be crucial. The DSL connection optimizer 180 determines an appropriate time to re-initialize, at 960, the DSL connection to achieve the performance gain. In general, the re-initialization may need to be performed when the loss of connectivity experienced during the line-probing phase can be minimized.

The decision of when to perform the re-initialization may be made either manually or automatically. In a manual mode, the decision of whether and when to re-initialize may be performed by the user 110. In this case, the DSL connection optimizer 180 may simply notify the user 110 the detected potential performance gain. It is then up to the user 110 to decide whether and when to perform the re-initialization to adapt to the changing transmission environment.

In an automatic mode, different criteria may be used to determine when to re-initialize the underlying DSL connection. For example, the DSL connection optimizer 180 may perform re-initialization immediately after a potential performance gain is detected. It may also perform a re-initialization at a fixed (pre-specified) day/time. As another alternative, the DSL connection optimizer 180 may also perform a re-initialization at a best time, which may be defined according to some non-critical conditions. For example, a non-critical condition may be specified as "if there is no data transmission in the last 15 minutes over the DSL connection".

The DSL connection optimizer 180 may be implemented in a way so that it is capable of performing any of the above mentioned exemplary re-initialization schemes and is re-configurable. For example, it may be configured to perform a certain re-initialization scheme when it is installed in a particular system. In general, the DSL connection optimizer 180 may be designed to handle different re-initialization scenarios.

Figure 10:
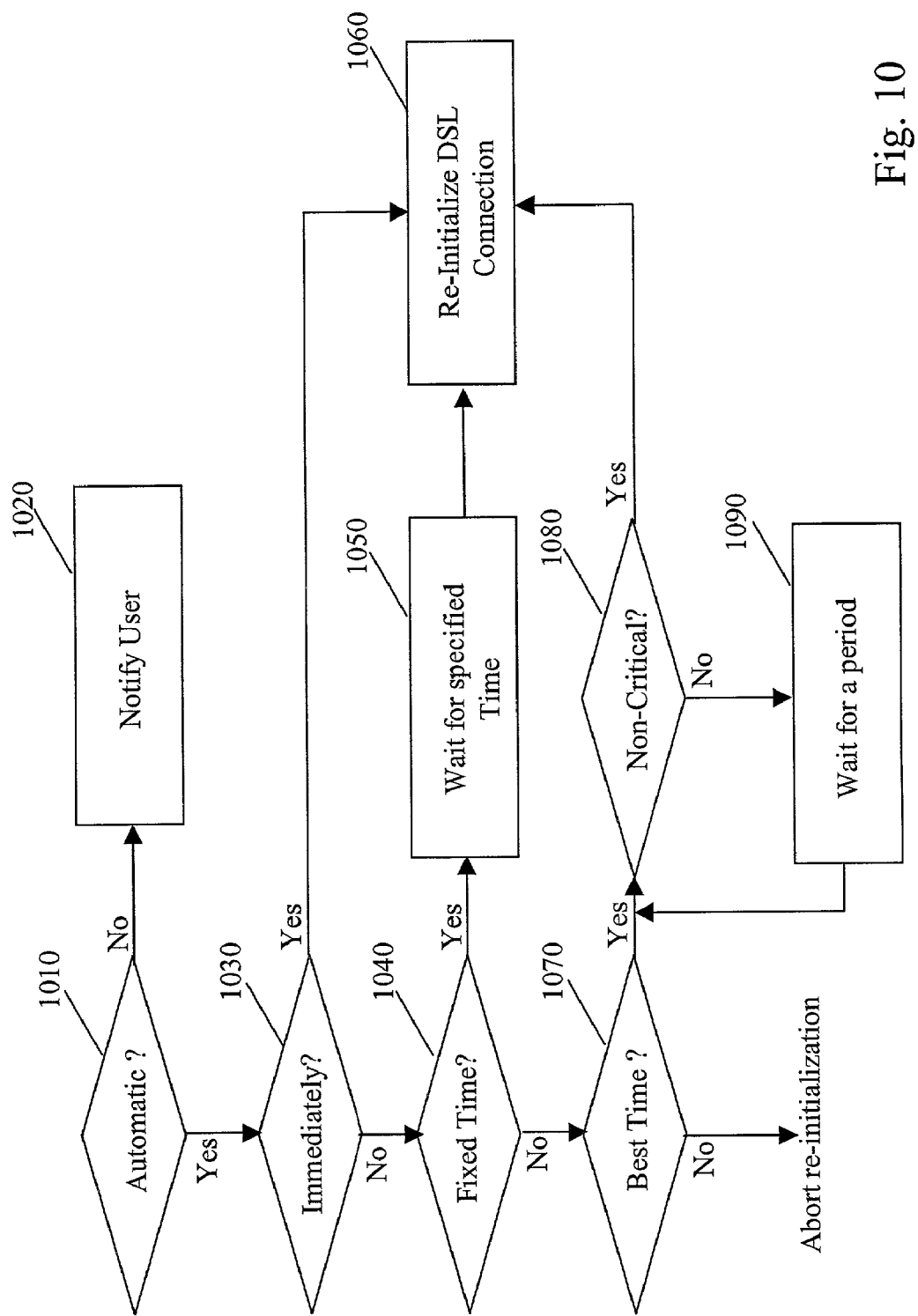
FIG. 10 is an exemplary flowchart of a process, in which re-initialization of a DSL connection to optimize the transmission rate is determined.

In the present invention, the re-initialization determiner 630 handles re-initialization at an appropriate time. FIG. 10 shows an exemplary flowchart for the re-initialization determiner 630. The mode of re-initialization operation (manual or automatic) is first determined at 1010. If it is in a manual operation mode, the re-initialization determiner 630 simply notifies, at 1020, the user 110 that there is a potential performance gain by re-initializing the DSL connection. If the mode of operation is automatic, it is determined, at 1030, whether the re-initialization is to be performed immediately. If the re-initialization is to be performed immediately, the re-initialization determiner 630 re-initializes the DSL connection at 1060.

If the re-initialization is specified to be performed at a fixed day and time, determined at 1040, the re-initialization determiner 630 simply waits, at 1050, until the specified day and time to proceed to 1060 to re-initialize the DSL connection. If the re-initialization is to be performed at a best time, determined at 1070, the re-initialization determiner 630 detects, at 1080 and 1090, a non-critical time to start the re-initialization.

As mentioned earlier, a non-critical time may be defined according to certain criteria. For example, it may be defined as an idle period of 15 minutes during which no data transmission is observed over the DSL connection that is to be re-initialized. When the non-critical condition is not satisfied, determined at 1080, the re-initialization determiner 630 may wait for a period of time and re-test the specified non-critical condition. When the non-critical condition is satisfied, the re-initialization determiner 630 proceeds to 1060 to re-initialize the underlying DSL connection.

The processing described above may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A system, comprising:
    a customer premise equipment for establishing a DSL connection via a copper line, said customer premise equipment connecting to said copper line;
    a DSL access multiplexer, connecting to said copper line, for establishing said DSL connection with said customer premise equipment via said copper line, said DSL connection being established between said customer premise equipment and said DSL access multiplexer with a dynamic transmission rate negotiated at initialization time based on characteristics of a transmission environment during the initialization time; and
    a DSL connection optimizer for adaptively optimizing the transmission rate between said customer premise equipment and said DSL access multiplexer by re-initializing said DSL connection based on varying characteristics of the transmission environment;
    wherein said DSL connection optimizer connects to both said customer premise equipment and said DSL access multiplexer and determines to re-initialize said DSL connection based on the connection statistics stored in both said customer premise equipment and said DSL access multiplexer.

2. A system comprising:
    a customer premise equipment for establishing a DSL connection via a copper line with a dynamic transmission rate negotiated at initialization time based on characteristics of a transmission environment during the initialization time, said customer premise equipment connecting to said copper line, said customer premise equipment establishing said DSL connection with an adaptively optimized transmission rate determined based on varying characteristics of the transmission environment and realized by re-initializing said DSL connection;
    a DSL access multiplexer, connecting to said copper line, for establishing said DSL connection via said customer premise equipment and said copper line; and
    a DSL connection optimizer for adaptively optimizing said transmission rate on said DSL connection based on varying characteristics of the transmission environment, said DSL connection optimizer determining to re-initialize said DSL connection based on connection statistics provided by said customer premise equipment.

3. A system comprising:
a customer premise equipment for establishing a DSL connection via a copper line, said customer premise equipment connecting to said copper line;
a DSL access multiplexer, connecting to said copper line, for establishing said DSL connection via said customer premise equipment and said copper line with a dynamic transmission rate negotiated at initialization time based on characteristics of a transmission environment during the initialization time, said DSL access multiplexer re-establishing said DSL connection with an adaptively optimized transmission rate determined based on varying characteristics of the transmission environment and realized by re-initializing said DSL connection; and
a DSL connection optimizer for adaptively optimizing said transmission rate on said DSL connection, said DSL connection optimizer determining to re-initialize said DSL connection based on the connection statistics provided by said DSL access multiplexer.

4. A system comprising:
a customer premise equipment for establishing a DSL connection via a copper line with a dynamic transmission rate negotiated at initialization time based on characteristics of a transmission environment during the initialization time, said customer premise equipment connecting to said copper line, said customer premise equipment establishing said DSL connection with an adaptively optimized transmission rate determined based on varying characteristics of the transmission environment and realized by re-initializing said DSL connection;
a DSL access multiplexer, connecting to said copper line, for establishing said DSL connection via said customer premise equipment and said copper line, said DSL access multiplexer establishing said DSL connection with an adaptively optimized transmission rate determined based on transmission environment and realized by re-initializing said DSL connection, based on varying characteristics of the transmission environment; and
a first DSL connection optimizer for adaptively optimizing said transmission rate on said DSL connection, said DSL connection optimizer determining to re-initialize said DSL connection based on the connection statistics provided by said customer premise equipment.

5. The system according to claim 4, wherein said DSL access multiplexer comprises:
a second DSL connection optimizer for adaptively optimizing said transmission rate on said DSL connection, said second DSL connection optimizer accessing connection statistics provided by said DSL access multiplexer and communicating with said first DSL connection optimizer to negotiate when to re-initialize said DSL connection.

6. A system for a DSL connection optimizer, comprising:
a statistics generator for generating past and current statistical information about transmission environment along a DSL connection between a customer premise equipment and a DSL access multiplexer based on connection statistics, wherein said statistical information reflects varying characteristics of the transmission environment;
a feasibility detector for detecting, based on said statistical information, whether there is a potential performance gain by re-initializing the DSL connection; and
a re-initialization determiner for determining when to re-initialize said DSL connection if there is a potential performance gain by re-initializing, detected by said feasibility detector.

7. The system according to claim 6, wherein said statistics generator comprises:
a historical statistics accumulator for generating historical statistics that characterize the past transmission environment defined with respect to a specified time scale and factors; and
a new statistics accumulator for generating new statistics that characterize the current transmission environment defined with respect to a specified time scale and factors.

8. The system according to claim 7, wherein at least one of said factors includes signal to noise ratio.

9. The system according to claim 7, wherein at least one of said factors includes cyclic redundancy check anomaly count.

10. The system according to claim 7, wherein said statistics generator further comprises: a control mechanism for controlling said time scales and said factors applied in both said historical statistics accumulator and said new statistics accumulator.

11. The system according to claim 6, wherein said feasibility detector comprises:
a comparison unit for comparing said past transmission environment and said current transmission environment based on said historical statistics and said new statistics to generate a performance differential margin; and
a potential performance gain detector for detecting a potential performance gain based on said performance differential margin.

12. A method, comprising:
establishing a DSL connection between a user and a central office via a customer premise equipment connecting to said user, a copper line connecting to said customer premise equipment, and a DSL access multiplexer connecting to both said copper line and said central office, said DSL connection being established using an initial transmission rate negotiated based on transmission environment detected during line probing;
collecting, by both said customer premise equipment and said DSL access multiplexer, connection statistics that reflect the DSL transmission performance and the transmission environment along said DSL connection between said customer premise equipment and said DSL access multiplexer, wherein said connection statistics reflect the varying characteristics of the transmission environment; and
detecting, by a DSL connection optimizer based on said connection statistics, whether there is a potential performance gain by re-initializing said DSL connection.

13. The method according to claim 12, further comprising re-initializing said DSL connection to achieve said potential performance gain.

14. The method according to claim 13, wherein said re-initializing comprises:
determining whether said re-initializing is to be performed automatically;
notifying said user about said potential performance gain, if said re-initializing is not to be performed automatically;

re-initializing said DSL connection immediately if an automatic re-initialization is to be performed immediately, determined by said determining;

re-initializing said DSL connection at a specified time if an automatic re-initialization is to be performed at a fixed time, determined by said determining; and detecting a non-critical time to re-initialize said DSL connection, if an automatic re-initialization is to be performed at a non-critical time; and re-initializing said DSL connection at said non-critical time.

15. A method for a DSL connection optimizer, comprising:

gathering connection statistics about a DSL connection between a customer premise equipment and a DSL access multiplexer via a copper line said DSL connection being established using an initial transmission rate negotiated based on transmission environment detected during line probing;

generating historical statistics based on said connection statistics to characterize past transmission environment on said DSL connection;

generating new statistics based on said connection statistics to characterize current varying transmission environment on said DSL connection; and detecting a potential performance gain based on said historical statistics and said new statistics.

16. The method according to claim 15, wherein said detecting comprises:

comparing said historical statistics and said new statistics to estimate a performance differential margin; and detecting said potential performance gain based on said performance differential margin.

17. A computer-readable medium encoded with a program, said program comprising:

establishing a DSL connection between a user and a central office via a customer premise equipment connecting to said user, a copper line connecting to said customer premise equipment, and a DSL access multiplexer connecting to both said copper line and said central office, said DSL connection being established using an initial transmission rate negotiated based on transmission environment detected during line probing;

collecting, by both said customer premise equipment and said DSL access multiplexer, connection statistics that reflect the DSL transmission performance and the transmission environment along said DSL connection between said customer premise equipment and said DSL access multiplexer, wherein said connection statistics reflect the varying characteristics of the transmission environment; and detecting, by a DSL connection optimizer based on said connection statistics, whether there is a potential performance gain by re-initializing said DSL connection.

18. The medium according to claim 17, further comprising re-initializing said DSL connection to achieve said potential performance gain.

19. The medium according to claim 18, wherein said re-initializing comprises:

determining whether said re-initializing is to be performed automatically;

notifying said user about said potential performance gain, if said re-initializing is not to be performed automatically;

re-initializing said DSL connection immediately if an automatic re-initialization is to be performed immediately, determined by said determining;

re-initializing said DSL connection at a specified time if an automatic re-initialization is to be performed at a fixed time, determined by said determining; and detecting a non-critical time to re-initialize said DSL connection, if an automatic re-initialization is to be performed at a non-critical time; and re-initializing said DSL connection at said non-critical time.

20. A computer-readable medium encoded with a program for a DSL connection optimizer, said program comprising:

gathering connection statistics about a DSL connection between a customer premise equipment and a DSL access multiplexer via a copper line said DSL connection being established using an initial transmission rate negotiated based on transmission environment detected during line probing;

generating historical statistics based on said connection statistics to characterize past transmission environment on said DSL connection;

generating new statistics based on said connection statistics to characterize current transmission environment on said DSL connection; and detecting a potential performance gain based on said historical statistics and said new statistics.

21. The medium according to claim 20, wherein said detecting comprises: comparing said historical statistics and said new statistics to estimate a performance differential margin; and detecting said potential performance gain based on said performance differential margin.

* * * * *